United States Patent [19]
Kerr, Jr.

[11] Patent Number: 5,860,548
[45] Date of Patent: Jan. 19, 1999

[54] JUNCTION BOX FOR CEILING FAN SUPPORT

[76] Inventor: Jack R. Kerr, Jr., 5253 Enchanted Oaks, College Station, Tex. 77845

[21] Appl. No.: 955,721

[22] Filed: Oct. 22, 1997

Related U.S. Application Data

[63] Continuation of Ser. No. 410,213, Mar. 24, 1995, abandoned, and a continuation-in-part of Ser. No. 902,906, Jul. 29, 1997, which is a continuation of Ser. No. 168,755, Dec. 16, 1993, abandoned.

[51] Int. Cl.$^6$ ..................................... H02G 3/12
[52] U.S. Cl. ........................... 220/3.2; 220/3.3; 220/3.6; 248/343; 248/906
[58] Field of Search .............................. 220/3.2, 3.3, 3.4, 220/3.5, 3.6, 3.9, 328, 327; 248/342, 343, 344, 906; 174/54, 57; 411/427, 500, 501, 84, 85, 171, 180, 181

[56] References Cited

U.S. PATENT DOCUMENTS

| | | | |
|---|---|---|---|
| 2,374,993 | 5/1945 | Haynes | 248/906 X |
| 2,454,962 | 11/1948 | Brown | 220/327 X |
| 2,914,601 | 11/1959 | Fuss | 248/342 X |
| 3,402,613 | 9/1968 | Neusel et al. | 411/427 X |
| 3,709,401 | 1/1973 | Walstrom | 220/327 |
| 4,019,647 | 4/1977 | Arnold | 411/180 X |
| 4,057,164 | 11/1977 | Maier | 248/906 X |
| 4,233,697 | 11/1980 | Cornwall | 220/327 X |
| 4,316,999 | 2/1982 | Nattel | 220/3.2 X |
| 4,463,923 | 8/1984 | Reiker . | |
| 4,538,786 | 9/1985 | Manning . | |
| 4,684,092 | 8/1987 | Reiker . | |
| 4,788,383 | 11/1988 | Caison . | |
| 4,861,211 | 8/1989 | Dunsmore | 411/501 |
| 4,892,211 | 1/1990 | Jorgensen . | |
| 4,909,405 | 3/1990 | Kerr, Jr. . | |
| 4,929,137 | 5/1990 | Bossenmaier | 411/501 |
| 4,988,067 | 1/1991 | Propp et al. . | |
| 5,152,648 | 10/1992 | Pratt | 411/43 |
| 5,222,864 | 6/1993 | Pearce | 248/344 X |
| 5,505,554 | 4/1996 | Lautenschlager Horst et al. . | 411/84 X |

*Primary Examiner*—Stephen Castellano
*Assistant Examiner*—Niki M. Eloshway
*Attorney, Agent, or Firm*—Daniel Rubin

[57] ABSTRACT

A ceiling box construction for supporting a relatively heavy hanging load such as a ceiling fan from the underside of a ceiling and comprised of an electrical junction box having lateral inwardly extending tabs. Coaxially aligned apertures in the tabs and top plate of the junction box accommodate the post of internally. threaded shoulder rivets that are threadedly engaged by upwardly extending load bolts having heads from which a received load is supported.

23 Claims, 3 Drawing Sheets

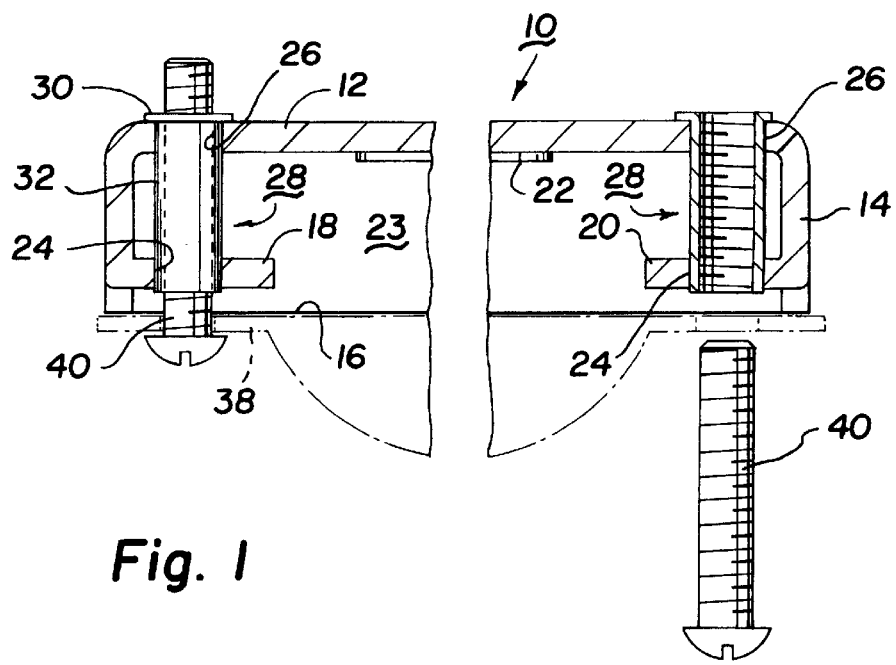
Fig. 1
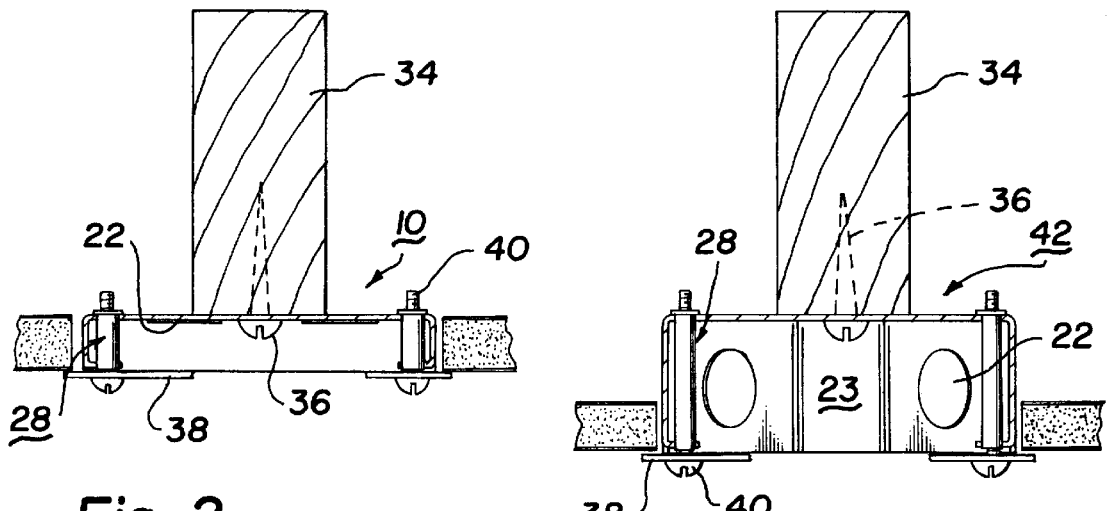
Fig. 2
Fig. 3

JUNCTION BOX FOR CEILING FAN SUPPORT

This application is a continuation of application Ser. No. 08/410, 213, filed Mar. 24, 1995, now abandoned and a continuation-in-part of application Ser. No. 08/902,906 filed Jul. 29, 1997 which is a continuation of application Ser. No. 08/168,755 filed Dec. 16, 1993 now abandoned.

FIELD OF THE INVENTION

The field of art to which the invention pertains comprises the art of support structures by which to hang relatively heavy units such as ceiling fans, light fixtures, etc. at a selected ceiling location.

BACKGROUND OF THE INVENTION

Ceiling fans typically represent a dynamic load of about 25 to 100 pounds. The most common form of support currently utilized is the electrical junction box that had been modified to accommodate increased loading not customarily imposed on the box. The box, in-turn, can be secured to the underside of a joist or other available mounting surface at the installation site. Where a suitable mounting surface is not available at the contemplated site of installation, a commercially available inter-joist hanger is customarily utilized for supporting the junction box.

BACKGROUND OF THE PRIOR ART

The use of an electrical junction box is essential for installation of a ceiling fan to accommodate the electrical connections required therefor. Modification of such boxes to allow for ceiling fan support is exemplified by the disclosures of U.S. Pat. Nos. 4,892,211; 4,988,067; RE.33,147; and RE.34,603. A form of modified junction box is also disclosed in my own prior U.S. Pat. No. 4,909,405 incorporated herein by reference.

For supporting the fan load, most of the junction boxes of the foregoing disclosures include the use of support bolts depending from above the top surface to below the lower plane of the box to a distal threaded end on which the load is received and secured. That arrangement enables an upper wall rather than the conventional tabs, to sustain the load and has been widely used. It is also largely suitable for the majority of installations.

In many installations however, use of a downwardly depending bolt can be difficult if not impossible to employ. In U.S. Pat. No. 4,892,211, the support bolts are relatively inverted being installed upward from beneath the junction box to engage a threaded aperture formed in the upper wall. The upper wall of the box in that arrangement functions as fastener nut for the support bolt. While relatively simple and convenient, the loading capability of that arrangement is limited by the afforded thread length of the aperture. In a box which typically has an upper wall thickness of approximately 1/16 inches, a maximum of only two threads is allowed.

OBJECTS OF THE INVENTION

It is an object of the invention to provide a novel electrical junction box construction for supporting a ceiling fan or other heavy objects.

It is a further object of the invention to effect the previous object with a junction box construction that permits inverted installation of the support bolts with a fastener nut affording significantly increased load capacity than heretofore.

It is a still further object of the invention to effect the previous objects with a novel arrangement of bolt and nut fasteners providing enhanced thread length engagement therebetween.

SUMMARY OF THE INVENTION

The invention hereof relates to a novel electrical junction box construction for supporting a relatively heavy hanging load from the underside of a ceiling. More specifically, the invention relates to an electrical junction box having a significantly increased load carrying capacity while utilizing inverted support bolts cooperating with a fastener nut depending downwardly within the box.

The foregoing is achieved in accordance with the invention by an electrical junction box of metallic composition. Oppositely positioned ears extend laterally inward above the bottom plane of the box and each includes an aperture through which the inverted load bolt can be inserted. Axially aligned with the ear apertures, in a preferred embodiment, are upper apertures formed in the upper box wall. Received in each pair of aligned apertures is an internally threaded shoulder rivet also known as an internally threaded post-binder rivet. Such rivets are of a T-shape configuration and available from commercial sources. They include a thin flange on one end integral with an elongated, barrel-like internally threaded post extending normal to the flange and in which to receive the threaded end of a load bolt. Rivets of that type are available in varying lengths of ½ inch, 1½ inch, 3–4 inches, etc.

In an alternative embodiment, the upper apertures are not aligned with the ear apertures that remain threaded and available for use in a conventional manner.

The upstanding bolts and depending rivets in either embodiment cooperate as fasteners with the bolt head, (with or without a washer), directly supporting a fan load disposed thereon. With a load being supported, the distal bolt ends will typically terminate within the rivet without penetrating through the upper aperture. At the same time, however, the elongated effect of the rivet affords a fastener thread length far exceeding similar purpose constructions of the prior art.

The features and advantages of the invention will be appreciated by those skilled in the art upon reading the detailed description which follows in conjunction with the drawings.

BRIEF DESCRIPTION OF THE DRAWINGS

FIG. 1 is a sectional elevation of a typical pancake size electrical junction box constructed in a preferred embodiment utilizing the components of the invention;

FIG. 2 is a reduction view similar to FIG. 1 illustrating the installed relation thereof;

FIG. 3 is a sectional elevation similar to FIG. 2 for the installed relation of a comparable standard size electrical junction box;

DESCRIPTION OF THE PREFERRED EMBODIMENT

Figure 4:
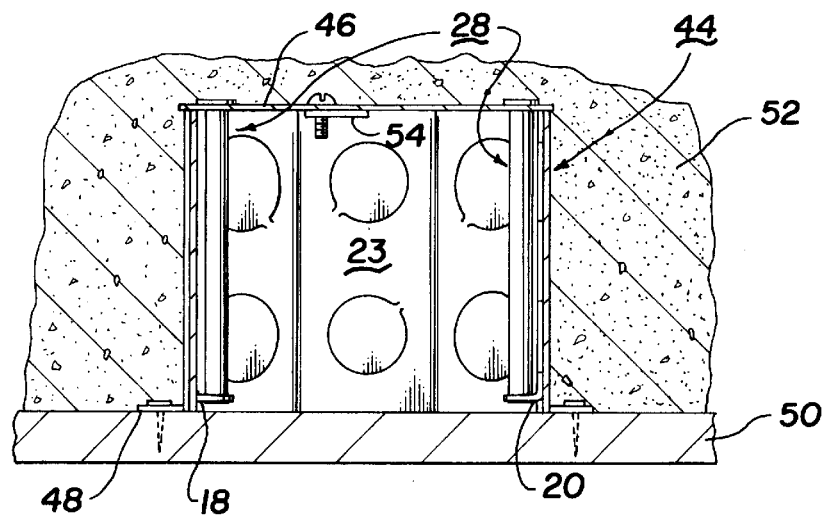
FIG. 4 is a sectional elevational of a concrete encased junction box in its initial installation step.

In the description which follows, like parts are marked throughout the specification and drawings with the same reference numerals respectively. The drawing figures are not necessarily to scale and the proportions of certain parts may have been exaggerated for purposes of clarity.

Referring now to the drawings, the invention hereof is illustrated in FIGS. 1 and 2 in the form of a pancake sized electrical junction box designated 10. The box includes a top wall 12, an annular side wall 14 integrally joined to the top wall and terminating at its underside at a bottom plane 16. Conventional, oppositely displaced tabs 18 and 20 are formed laterally inward of the side wall and typically include a threaded aperture (not shown). The interior upper surface of top wall 12 includes one or more electrical knock-outs 22 and within the box there is defined an open cavity 23.

In accordance with this embodiment of the invention the original threaded apertures of tabs 18 and 20 have been rendered threadless and enlarged to a diameter 24. Coaxially aligned with each of the tab apertures is a threadless aperture 26 formed through top wall 12. The diameter of apertures 24 and 26 are sized to slidably accommodate a commercially available internally threaded shoulder rivet 28. Such rivets are likewise known as post binder rivets comprised of a flange or shoulder 30 joined to an internally threaded upright elongated post 32. For the embodiments being described, such rivets are typically of about 9/32 inches in diameter and vary between ½ inches (FIGS. 1 and 2) to about 4 inches in length (FIG. 4). Each of the rivets 28 in this arrangement depend downwardly through aperture 26 and its paired aligned tab aperture 24 with top flange 30 engaging the top surface of top wall 12. A fan load to be supported typically includes a bracket 38, which for purposes hereof, is supported in place by the head of load bolts 40 screwed into the bottom post opening of rivets 28.

Prior to hanging of the load, the assembled box can conveniently be installed to the underside of a joist 34 via wood screws 36. Alternatively, the box can be supported by an interjoist hanger as disclosed for example in my prior patent cited supra. In either arrangement, the length of engageable threading available between the rivets and load bolts 40 is equal to at least the length of extension posts 32. As a result, the substantially increased thread engagement effected therebetween significantly enhances the comparative load bearing capability of the installation.

The embodiment of FIG. 3 is completely analogous to that just described except that the electrical junction box designated 42 is of standard or regular size (not pancake). It utilizes longer rivets 28 of approximately 1½ inches in length and correspondingly longer load bolts 40. As before, the box can be mounted to the underside of a joist 34 or be supported from an inter-joist hanger structure of a type disclosed, for example, in my own prior patent cited supra.

Figure 5:
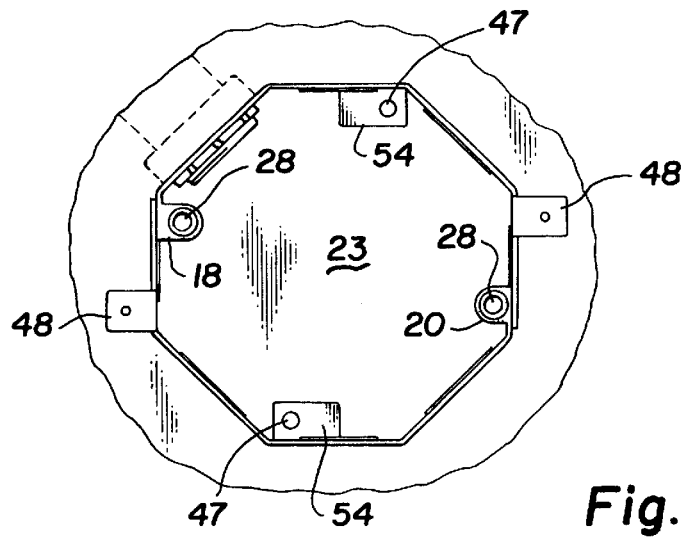
FIG. 5 is a bottom plan view of the junction box of FIG. 4 during a second installation step.
Figure 6:
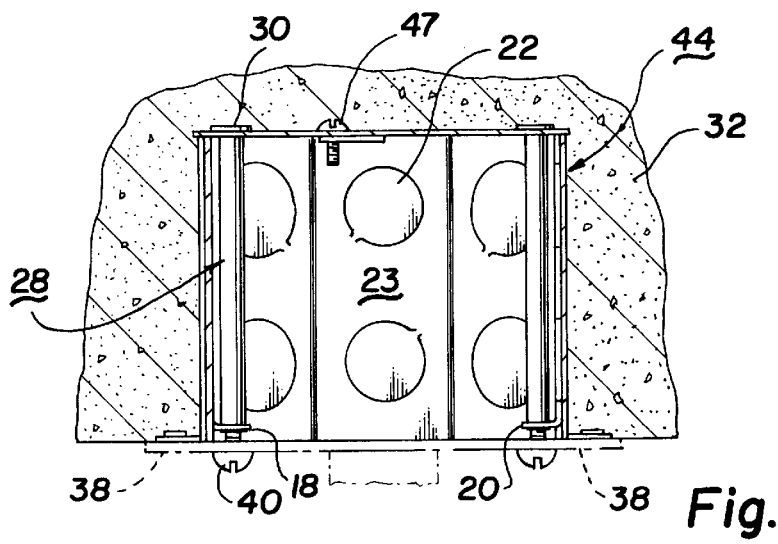
FIG. 6 is a sectional elevation similar to FIG. 4 illustrating a post-installation step.

For the embodiment of FIGS. 4–6 there is illustrated an electrical junction box 44 hereof suitable for concrete encasement. Such annular boxes are typically of octagonal cross section and approximately 32 inches in height. For installation, the open box is supplied with a detachable cover plate 46 secured in place by screws 47 and tabs 54 to form a top wall closing off the upper end thereof. A pair of outwardly extending tabs or flanges 48 enable the box to be initially secured to a suitable decking form 50 of wood or the like. In this manner, the box is supported during pouring of wet aggregate 52 thereabout. After the aggregate has cured, the decking form 50 is removed so as to leave the underside of the encased box open and exposed to cavity 23 as best seen in FIG. 5. As above, box 44 is provided with internally threaded shoulder rivets 28 depending through the cover plate 46 and into tabs 18 and 20.

Once decking form 50 has been removed, support bolts 40 of increased length can be threadedly inserted into rivets 28 for the bolt heads to support a fan load bracket 38 as before. It is preferable, in at least this arrangement, that the distal ends of load bolts 40 terminate within the rivets somewhat short of shoulder 30 in order not to encounter the concrete set thereabout.

Figure 7:
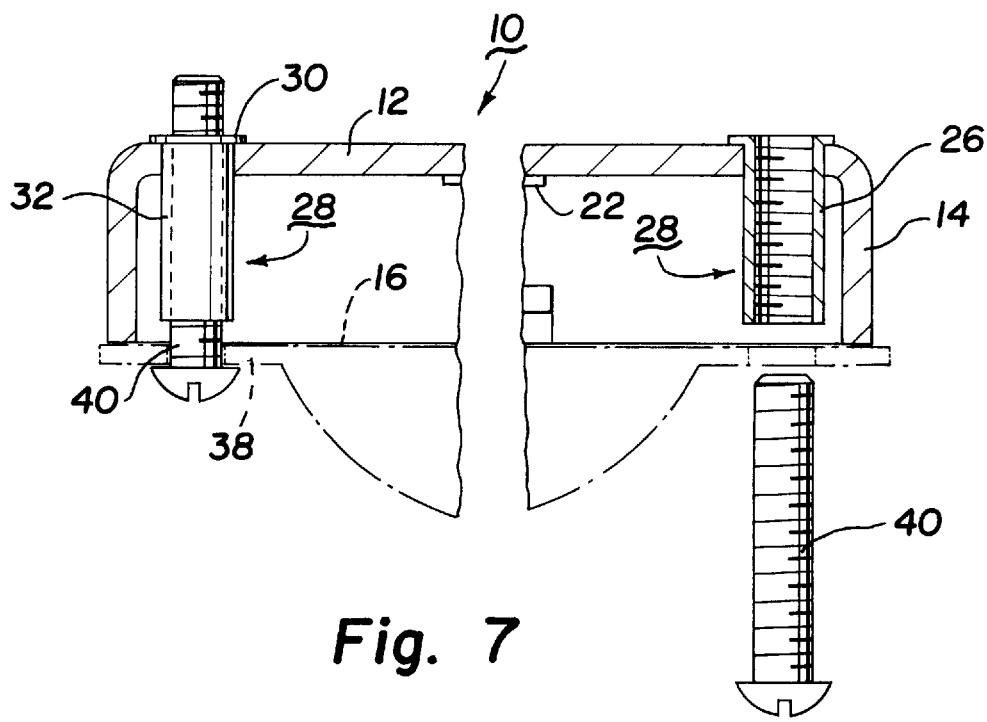
FIG. 7 is a sectional elevation similar to FIG. 1 for an alternative embodiment.
Figure 8:
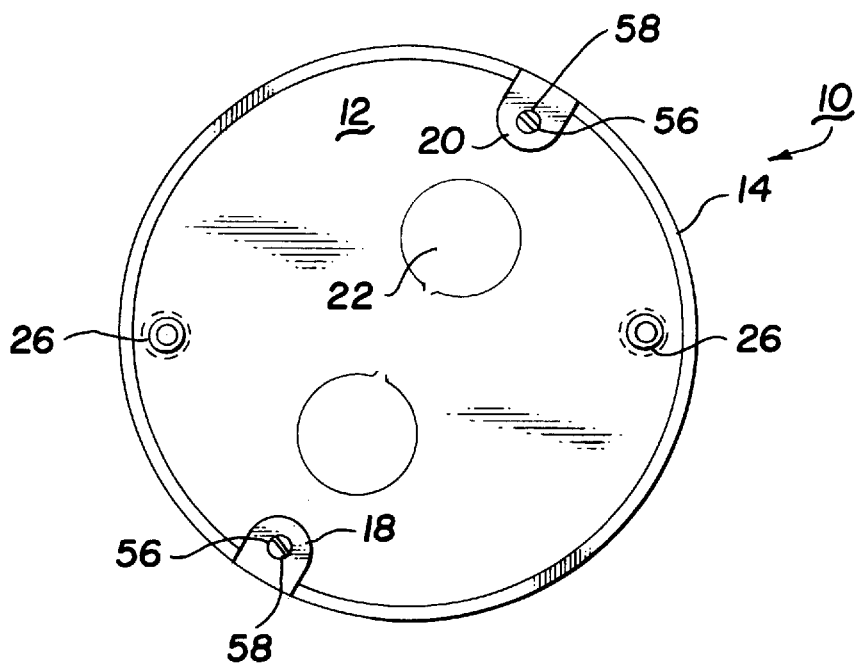
FIG. 8 is a bottom plan view of the electrical junction box of FIG. 7.

For the alternative embodiment of FIGS. 7 and 8, ears 18 and 20 include the standard threaded apertures 56 tapped to receive standard 8-32 screws 58. Top wall apertures 26, instead of being aligned with apertures 56, are angularly displaced therefrom so as to permit use of both apertures 56 and rivets 28 independent of each other. This arrangement affords flexibility for a future fan installation such as may be desireable for a "spec" home constructed without a fan installation and in which a light weight fixture, for example, may be initially supported from the ears.

By the above description there is disclosed a novel arrangement for supporting a ceiling fan from an electrical junction box. The box can be readily assembled on-site while affording significantly greater length of common thread engagement between the support bolts and the cooperating fastener nut thereof in the form of a shoulder rivet. Consequently, the assembly enjoys the convenience and simplicity of utilizing an inverted support bolt while ensuring that adequate thread engagement is achieved to support the contemplated fan load to be suspended therefrom. By this means, a relatively simple arrangement of components obtains a novel result not previously known in the art.

Since many changes could be made in the above construction and many apparently wide different embodiments of this invention could be made without departing from the scope thereof, it is intended that all matter contained in the drawings and specification shall be interpreted as illustrative and not in a limiting sense.

I claim:

1. A ceiling box for providing support for an installed load suspended from the underside of the box, comprising:

an annularly configured side wall defining an internally open cavity of height extending between a top end of said side wall and a bottom plane at a bottom end of said side wall;

a top wall overlying the top end of said side wall;

at least a pair of load supportable shoulder rivets, said rivets being arcuately spaced internally threaded and depending within said cavity from an upper end in a substantially flush relation above said top wall to toward said bottom plane; and load bolts extending upward for threadedly engaging each of said rivets for a mutual length at least correlated to the magnitude of load to be suspended and adapted collectively with said rivets for supporting a suspended load installed at the underside of said box.

2. A ceiling box in accordance with claim 1 in which said shoulder rivets include a shoulder positioned externally above said top wall and an internally threaded post joined integrally to said shoulder and depending within said cavity.

3. A ceiling box in accordance with claim 1 in which said top wall and said side wall are integrally joined.

4. A ceiling box in accordance with claim 3 in which said box comprises an electrical junction box.

5. A ceiling box in accordance with claim 4 in which said shoulder rivet has a post and the length of said post is proportioned to the height of said box.

6. A ceiling box in accordance with claim 4 in which the height of the box is about ½ inches for an electrical box of pancake size.

7. A ceiling box in accordance with claim 4 in which the height of said box is about 1½ inches for an electrical junction box of standard size.

8. A ceiling box in accordance with claim 1 including tabs extending laterally outward from said side wall at an underedge of said box for securing said box to an underlying decking form during the pouring of aggregate thereabout.

9. A ceiling box for providing support for an installed load suspended from the underside of the box, comprising:
   a annularly configured side wall defining an internally open cavity of height extending between a top end of said side wall and a bottom end of said side wall;
   a top wall overlying the top end of said side wall;
   angularly displaced tabs extending from said side wall laterally inward of said cavity near the bottom end of said side wall;
   apertures defined coaxially paired in said tabs and said top wall;
   an internally threaded shoulder rivet depending from above said top wall through each pair of said paired apertures; and
   a load bolt extending upward through each of said tabs for threadedly engaging a rivet thereat and adapted collectively for supporting a suspended load installed at the underside of said box.

10. A ceiling box in accordance with claim 9 in which said shoulder rivets include a shoulder positioned externally above said top wall and an internally threaded post joined integrally to said shoulder and positioned in each pair of said paired apertures.

11. A ceiling box in accordance with claim 9 in which said top wall and said side wall are integrally joined.

12. A ceiling box in accordance with claim 11 in which said box comprises an electrical junction box.

13. A ceiling box in accordance with claim 12 in which said shoulder rivet has a post and the length of said post is proportioned to the height of said box.

14. A ceiling box in accordance with claim 12 in which the height of the box is about ½ inches for an electrical box of pancake size.

15. A ceiling box in accordance with claim 12 in which the height of said box is about 1½ inches for an electrical junction box of standard size.

16. A ceiling box in accordance with claim 9 including second tabs extending laterally outward from said side wall for securing said box to an underlying decking form during the pouring of aggregate thereabout.

17. A ceiling box for providing support for an installed load suspended from the underside of the box, comprising:
   an annularly configured side wall defining an internally open cavity of height extending between a top end of said side wall and a bottom plane at a bottom end of said side wall;
   a top wall overlying the top end of said side wall;
   at least a pair of load supportable shoulder rivets, said rivets being arcuately spaced internally threaded and depending within said cavity from above said top wall to toward said bottom plane;
   load bolts extending upward for threadedly engaging each of said rivets and adapted collectively with said rivets to define a first load support having a first fastener connection for supporting a relatively heavy suspended load installed at the underside of said box; and
   a pair of internally threaded angularly displaced tabs extending from said side wall laterally inward of said cavity near the bottom end of said side wall and arcuately displaced from the location of said rivets to define a second load support having a second fastener connection for alternatively supporting a relatively light suspended load installed at the underside of said box, with said first and second connections being differently sized to receive correspondingly different sized fasteners for the contemplated loading of said respective load supports.

18. A ceiling box in accordance with claim 17 in which a relatively light load is installable at said second support utilizing 8-32 screw fasteners threaded into said tabs.

19. A dual purpose ceiling box providing alternative support for either a relatively heavy or a relatively light installed load suspended from the underside of the box, comprising:
   an annularly configured side wall defining an internally open cavity of height extending between a top end of said side wall and a bottom plane at a bottom end of said side wall;
   a top wall overlying the top end of said side wall;
   a first load support secured from within said box and having a first fastener connection for supporting the relatively heavy suspended load installed at the underside of said box; and
   a second load support including a second fastener connection comprising a pair of internally threaded angularly displaced tabs extending from said side wall laterally inward of said cavity near the bottom end of said side wall and arcuately displaced from the location of said first load support for alternatively supporting the relatively light suspended load installed at the underside of said box, with said first and second connections being differently sized to receive correspondingly different sized fasteners of different load bearing capacities for the contemplated loading of said respective load supports.

20. A ceiling box in accordance with claim 19 in which a relatively light load is installable at said second support utilizing 8-32 screw fasteners threaded into said tabs.

21. A dual purpose ceiling box assembly providing alternative support for either a relatively heavy or a relatively light installed load suspended from the underside of the box, comprising:
   an annularly configured side wall defining an internally open cavity of height extending between a top end of said side wall and a bottom plane at a bottom end of said side wall;
   a top wall overlying the top end of said side wall;
   a first load support secured adjacent said side wall and having a first fastener connection for supporting the relatively heavy suspended load installed at the underside of said box; and
   a second load support including a second fastener connection and comprising a pair of internally threaded angularly displaced tabs extending from said side wall laterally inward of said cavity near the bottom end of said side wall and displaced from the location of said first load support for alternatively supporting the relatively light suspended load installed at the underside of said box, with said first and second connections being differently sized to receive correspondingly different sized fasteners of different load bearing capacities for the contemplated loading of said respective load supports.

22. A dual purpose ceiling box assembly providing alternative support connections for either a relatively heavy or a relatively light installed load suspended from the underside of the box, comprising:

an annularly configured side wall defining an internally open cavity of height extending between a top end of said side wall and a bottom plane at a bottom end of said side wall;

a top wall overlying the top end of said side wall;

a first load support connection within said box secured adjacent said side wall for supporting the relatively heavy suspended load installed at the underside of said box; and a second load support connection within said box secured adjacent said side wall and displaced from the location of said first load support connection for alternatively supporting the relatively light suspended load installed at the underside of said box, with said first and second connections being differently sized to receive correspondingly different sized fasteners of different load bearing capacities for the contemplated loading of said respective load supports.

23. A ceiling box in accordance with claim 22 in which said first load support connection includes an elongated fastener extending dependently downward from a downward engagement against the top wall of said box.

* * * * *